United States Patent [19]

Shah

[11] Patent Number: 5,059,876
[45] Date of Patent: Oct. 22, 1991

[54] BRUSHLESS ROTATING ELECTRICAL MACHINE

[76] Inventor: Emanuel E. Shah, 1221 Trinity Dr., Benbrook, Tex. 76126

[21] Appl. No.: 448,990

[22] Filed: Dec. 12, 1989

Related U.S. Application Data

[63] Continuation-in-part of Ser. No. 130,957, Dec. 10, 1987, abandoned.

[51] Int. Cl.$^5$ ............................................. H02P 7/00
[52] U.S. Cl. ................................. 318/254; 318/700; 318/721; 318/722
[58] Field of Search ............... 318/138, 254, 700, 705, 318/712, 715, 716, 720, 721, 722; 310/91, 156, 261, 268

[56] References Cited

U.S. PATENT DOCUMENTS

| | | | |
|---|---|---|---|
| 407,844 | 7/1889 | Thomson | 310/268 X |
| 1,834,803 | 12/1931 | Plenge | 310/261 |
| 2,479,589 | 8/1949 | Parker | 310/268 |
| 2,768,315 | 10/1956 | Okabe | 310/156 X |
| 2,841,745 | 7/1958 | Shields | 310/156 X |
| 2,897,383 | 7/1959 | Barrows et al. | 310/261 X |
| 3,004,381 | 10/1961 | Schweitzer | 310/156 X |
| 3,134,038 | 5/1964 | Schilling | 310/156 |
| 3,195,039 | 7/1965 | Koning | 310/261 |
| 3,205,384 | 9/1965 | Sears | 310/156 |
| 3,398,386 | 8/1968 | Summerlin | 310/261 |
| 3,445,697 | 5/1969 | Costa | 310/68 R |
| 4,883,977 | 11/1989 | Regan | 318/138 |

*Primary Examiner*—Bentsu Ro

[57] ABSTRACT

A brushless rotating electrical machine based on a novel rotatable transformer. The motor can operate on both AC or DC. The rotatable transformer, termed brushless power unit, transfers power to the rotating armature without any physical contact and the operation of the brushless power unit is independent of speed of armature. A sensor on the armature detects the position of the armature coils in relation to magnetic neutral axis and switches semiconductor switching devices located on the armature to reverse the direction of current in the armature coils to commutate the current and produce a continuous torque. The electronic commutation is also applied to polyphase AC machines to obtain brushless operation. DC excitation system for synchronous machines can obtain brushless operation using the brushless power unit.

14 Claims, 7 Drawing Sheets

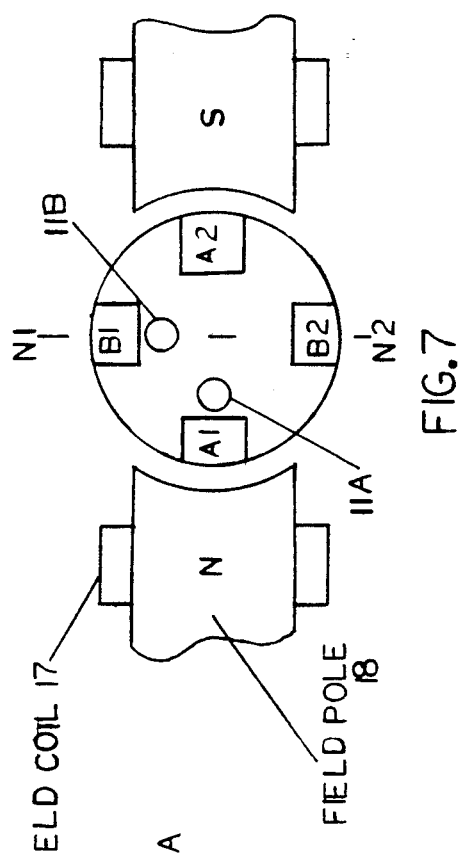
FIG. 7
FIELD COIL 17
FIELD POLE 18
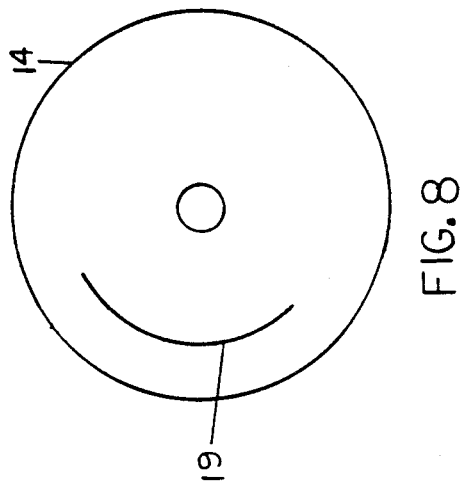
FIG. 8
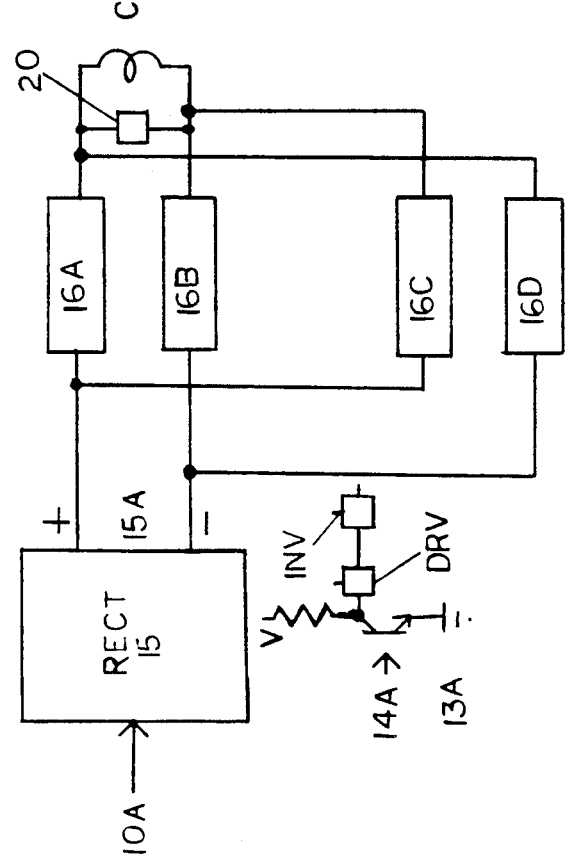
FIG. 6
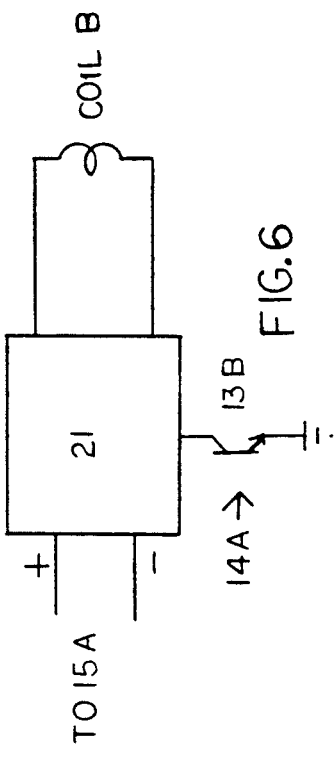

BRUSHLESS ROTATING ELECTRICAL MACHINE

This application is a continuation - in - part of prior pending Application Ser. No. 07/130,957 filed Dec. 10 1987, now abandoned of Emanuel E. Shah for Brushless rotating electrical machine.

FIELD OF THE INVENTION

The present invention relates to a novel rotatable transformer based on a new design concept which offers new and cost effective applications to rotating electrical machines. It is utilized in brushless DC and AC motors able to provide superior performance characteristics at lower cost over prior art machines. It is also employed efficiency in a new DC excitation system for synchronous machines.

BACKGROUND OF THE INVENTION

The commutator and brush type machines available in the prior art have some unique performance characteristics which makes them indispensable over other types of machines such as induction, synchronous, and some eddy current drives available in the current technology.

Applications such as traction very high speed drive drives requiring rapid acceleration drives requiring high maximum torques and large power rating drives which require variable) speed and leading power factor operation can only be effectively accomplished by the brush type machines.

The unique characteristics which are of interest to some specific applications are very high starting torques. constant and maximum torque over full speed range very high speeds. Infinitely variable speeds and characteristics offered by a series motors which makes it ideally suitable for traction application. These performance characteristics offered by the brush type machines are not obtained by other types of machines.

However, due to some serious limitations and disadvantages, which are well known &n the prior art such as brush wear carbon dust sparking and other maintenance and reliability related problems many attempts have made to replace the brush type with brushless machines.

One such replacement attempt is the variable frequency drive. In this drive a variable frequency voltage is applied lo an induction or synchronous machine. By varying the frequency of an input supply the speed of the motor is controlled over a wide range and variable speed operation is obtained. Although speed control on this type of machine is satisfactory but due to synchronous or induction operation the starting torque is not sufficiently high. On larger drives, due lo the presence of the harmonics of the supply frequency the sinusoidal waveform of the input supply voltage is distorted. Another disadvantage of the variable frequency drive is the cost of electronics needed lo achieve a variable frequency control. One more disadvantage of the drive is there reduction in efficiency due to the electronics involved.

Another candidate drive is using an induction motor unit with phase wound rotor as an exciter where power output from the rotor is used to energize armature of a machine generally located on the same shaft and having a separate stator. This type of brushless arrangement has also many problems. The output voltage and frequency varies with the speed and operation near and above synchronous speed is not possible. Many attempts have been made lo overcome these problems and have only partially resolved at the expense of extra hardware, adding to the cost and reducing the efficiency. Most of the applications utilizing phase wound induction machine is general directed towards only providing excitation to synchronous machine. No attempt has been made to use phase wound induction machine to provide power for commutated AC or DC machine as in such an arrangement the size of the phase wound machine would become prohibitively large.

Another candidate application to provide a brushless operation is to use a DC machine armature to provide power to the rotor of a machine mounted on the same shaft. The major problem with this type of machine is that it does not work al zero speeds and works poorly al low speeds. In addition il requires complicated excitation mechanism of its own. Its use is primary limited to synchronous machine.

One more brushless machine widely used in the prior art is the permanent magnet rotor electrically commutated motor. Although it performs satisfactorily in small ratings for larger ratings the permanent magnet rotor becomes too large. It will also have serious problems with demagnetization during operation and the overall cost of the machine will not be economical Also on average these motors are much more costly compared to the other colors of identical ratings.

Over the years many efforts have been made to achieve true brushless operation. However, most of the machines developed were based on the concepts that were already in existence. As a result the brushless machines evolved over the years were basically improvements over the previous generation of machines based on the concepts that have not changed for decades. The performance characteristics obtained from these machines were not meeting the requirements of the applications rather the applications were modified to suit the requirements of the brushless drives. An example would be railroad traction. A brush type series motor provided with an inverter can provide both optimum traction performance and regenerative braking returning the brake energy lo the supply lines. The problems related to brushes however, makes an alternate traction drive a necessity.

A variable frequency drive consisting of an induction motor controlled by an electronic variable frequency voltage source is now being considered for future traction application. Compared to brush type series motor, this drive configuration is not cost effective and does not provide optimum performance however in absence of any other a brushless drive able to overcome the limitations of variable frequency drive the variable frequency drive is the chosen candidate drive system.

Another example stressing the need for a new brushless color concept is the automobile. The color and generator requirements in a automobile clearly require a brushless motor and a generator, which will greatly increase the over all reliability of an automobile. However, in this instance also due lo absence of a cost effective alternatively brush type motors and generators are still being used with a disadvantage of a lower reliability.

Rotatable transformers have been employed efficiently to transform power form a stationary device to a rotating member and vice versa for a number of different applications besides brushless machines. The prior art rotatable transformers have inherent limitations of unstable performance over a wide speed range because the frequency of the secondary member changes with the variations in speed affecting the performance of the rotatable transformer. A need for a rotatable transformer with stable performance over a wider speed range exists for a large number of applications. Whereby a performance and cost gains can be realized by employing a superior rotatable transformer.

Polyphase commutator motors in large power ratings have been very successfully used on variable speed applications primary because it provides variable speed operation at leading power factor. Leading power factor operation is critical al large power ratings for economical operation. The overall cost of the machine is also lower than that of a variable frequency drive. However, no brushless machine operating as polyphase commutated color exists in the prior art.

From the foregoing discussion it is evident that the existing brushless machines known in the prior art are not capable of providing superior and unique performance characteristics provided by the brush and commutator type AC and DC machines. Over the years, the requirements imposed on electrical machines have been increasingly becoming stringent due to rapid advances in all the areas of the technology where rotating electrical machines are employed. The numerous Problems posed by brush type machines are therefor becoming totally unacceptable A long standing need for a reliable and totally brushless electrical machines with superior performance characteristics has become critical.

SUMMARY OF THE INVENTION

The present inventor, in a new concept of brushless machine architecture proposed in accordance with the teaching of the present invention discloses a truly novel and unique rotatable transformer based AC and DC motor. Also disclosed is a brushless excitation system for DC excitation of the synchronous machines. The purpose of the rotatable transformer in the present invention is to transfer power from a stationary source lo a rotating armature. The rotatable transformer therefore will be described and designated as a brushless power unit in the following discussion.

The concept and the machine architecture of the new Brushless power unit and it's application to the brushless electrical machine in accordance with the teaching of the present invention has been first proposed by the present inventor. Because of this reason the design concepts employed therein is a total departure from the concepts and the design principles used in the prior art brushless electrical machine. Therefore, in order lo fully describe and illustrate the present invention, it will be appropriate lo describe the theory of operation that guides the design principles used in the design and construction of the brushless electrical machines based on the teaching of present invention. This description and exposition of the theory of operation will, therefor, enable those skilled in the art to fully understand the design principles taught in the present invention.

The summary will be first described in terms of the theory of operation and function of the brushless power unit and it's application to brushless electrical machine. The objects of the present invention will then be stated in the ed[of the summary. The brushless power unit,in accordance with the teaching of the present invention, is the central member around which the rotating machines claimed in the present invention are designed. The brushless power unit which will be described in detail later in the summary and further illustrated in the detailed description of the invention is functionally equivalent lo a set of brushes and slip rings. It is also equivalent to a rotatable transformer found in the prior art, without the performance limitations of the prior art rotatable transformers. A single phase brushless power unit is equivalent to two stationary brushes and two slip rings mounted on a rotating shaft. The brushless power unit basically includes two main functional parts. First part is a stationary stator and comprises a stator coil. The second part is generally a roller mounted on a rotating shaft and comprises a rotor coil.

The power transfer can occur in either direction between the two members of the brushless power unit.

The new machine architecture concepts introduced in the present invention will be more effectively communicated and presented to the reader who is skilled in the art and who is already familiar with the working of the prior art machine such as a DO shunt motor, by providing a parallel comparison of the prior art machine parts and functions they perform with that of the parts and functions of the present invention as proposed by the preset inventor.

Continuing along these lines those skilled in the art will recognize the fact that for a DC shunt motor lo opera+=in a desired manner, four main functional requirements will have to be satisfied.

(a) A field pole assembly able to generate magnetic field.
(b) An armature carrying current in coil oonduotors and linking the conductors to field pole flux.
(c) A commutating means to reverse the direction of current in each coil when the coil passes through a neutral axis between two field poles.
(d) A means to transfer power from a stationary source lo a rotating coils.

In the prior art machines the function of transferring the power to the rotating coils is performed by the carbon brushes. And the function of commutation in the armature coils is performed in combination by the commutator and the carbon brushes.

In any D.C. machine the armature coils, by themselves do not have any ability lo transfer power from a stationary source to a rotating coils. Since power and current in coils is necessary to produce torque in the armature, a separate means to transfer power is required. In light of the teaching of the present invention this function of transferring the power to the armature is performed by the Brushless power unit. Since the brushless power unit also as a pair of brushes and slip rings the power transfer function can be performed by the brushless power unit without any brushes or sp rings in a DC shunt motor. Likewise in any D.. machine the armature coils by themselves, do not have any ability to commutate current in the coils. A separate commutating means, as stated earlier has to be provided which will perform this function.

The function of commutation of current in the armature coils in accordance with the teaching of the present invention is performed by plurality of semiconductor switching devices located on the rotating armature. The semiconductor switching devices are connected between the power source, which is the brushless power unit and each armature coil.

Two sets of semiconductor switching devises are provided for each coil. A first set of semiconductor switching devices switches the coil current in one direction while the second set switches the current in the opposite direction lo that of the first set.

All the semiconductor switching devices performing the function of commutation, are controlled by a sensor such as a phototransistor located on the armature. The sensor is located at the same angular position where the coil which il controls is located. Because of this, as the armature and the coil rotates, the sensor also rotates with the coil.

A stationary disc is provided on the stator. The object of the disc is to provide controlling effect on the sensor in such a manner that the disc acts as an enabling element by interacting with the sensor. which in turn, controls the on / off switching of the sensor. The sensor, interacting with the disc, switches one pair of semiconductor switching device driving the coil current in one direction, when the coil is on one side of the field pole neutral axis between the two poles. The disc switches the sensor in the opposite state when the coil reaches the other side of the field pole neutral axis between the two poles.) And switching the other pair of semiconductor switching device thereby reversing the direction of the current in the coil. Those skilled in the art will recognize the fact that when a current carrying armature coil, rotating in a magnetic field reverses the direction of current flow when passing from one side of the field pole neutral axis between two poles, to the next, a commutation of current is performed. And a continuous torque is generated by the armature coils and as a result a motor action is obtained.

The function of element parts (a) lo (d) described above for the prior art machines are performed by equivalent functions in the brushless machine of the present invention by a combination of a brushless power unit, a sensor, a switching disc and a combination of semiconductor switching devices. The synergis created by the combination of these elements in the present invention creates a viable new concept in the design of a brushless electrical machines.

The theory behind the operation of each element empoyled in the construction of the brushless rotating machine in accordance with the teaching of the present invention will be described in delay in the following discussion.

It should be noted by the reader that the design concept employed in the construction of the brushless power unit in accordance with the teaching of the present invention is totally different from that of the rotatable transformers found in the prior art in many important respects. Because of the new concept applied to the construction of the brushless power unit, it is possible to overcome the limitations and disadvantages of the prior art rotatable transformers.

The function and construction of the brushless power unit that eliminates the limitations and the disadvantages of the prior art rotatable transformers can be best explained by oomparing its construction and operation with the construction and operation of the phase wound rotatable transformers found in the prior art.

The phase wound rotatable transformers are constructed by winding multiple coils in stator and rotor slots. Because of the presence of multiple coils and slots the size of the rotatable transformers increases drastically as the rating of the machine increases. Especially for the large rating rotatable transformers the size becomes prohibitively large for any practical application.

The brushless power unit on the other hand can be constructed with as few as only one stator coil and only one rotor coil and no stator or rotor slots at all. Because of this reason, the size of the brushless power unit can be effectively kept within practical and economical limits.

The operation of phase wound rotatable transformer consists of the rotor poles mutually linking the stator flux in such a manner that the flux linked by the rotor coils changes with the change in angular position between the rotor coils and the stator poles. Because of this, the rotor frequency and rotor output voltage changes with the change in rotor speed or the slip between the stator and the rotor. This causes many problems in the successful application of the rotatable transformer to the rotating machines based on the rotatable transformers. The rotor operation al speed above the synchronous speed is not possible.

The brushless power unit in accordance with the teaching of the present invention, however, operates independent of the slip between rotor and the stator. It can operate from zero speed to many limes the synchronous speed determined by the number of stator poles. It can also operate efficiency in either direction of rotation, without any reversal or change in the polarity of the rotor voltage.

The principles and the theory behind the operation of the brushless power unit can be explained by the following example and description. Consider a closed magnetic circuit as shown in FIG. 1A which is formed by connecting four cylindrical members A, B, C, and D made from a magnetic material and able to transfer flux from one member lo the nexl. A primary coil is wound on member A and a secondary coil is wound on member D. Xl, X2 is the axis passing through the center of member D. it will be observed by the reader that the primary and the secondary windings are mutually coupled by the closed magnetic circuit, formed by members A, B, C, and D and thus forming a transformer device and creating a true transformer action between the primary and the secondary. The principles and the theory behind the operation of the transformer action is well known in the art.

Based on the principles of transformer action, il will be observed that when an AC or any time varying voltage is applied lo the primary coil, the secondary coil being mutually coupled with the primary coil, will have induced voltage produced in the secondary and the power will be transferred from the primary coil to the secondary coil.

Now suppose that the cylindrical member D is separated from the remainder of the closed magnetic circuit formed by A, B, C, and D by cutting the member D at points D1 and D2 and providing air gaps at points D1 and D2 as indicated and shown in figure 1B. The axis Xl X2 still passes through the center of member 0 and the separated central member located between D1 and D2 still contains the secondary coil as shown in FIG. 18. The transformer action will still occur with air gaps at D1 and D2 allowing the flux lo pass through the air gaps and forming a closed magnetic circuit with the members A, B, C, and the separated part of the member D. Now suppose that a rotatable shaft is introduced through the center of the secondary coil and attached to the part of the member D separatad by air Saps at D1 and D2. The shaft is placed along the center line X1, X2 and is free to rotate without obstruction by members A, B, C, and part of member D which is connected to members B and C. When a voltage is impressed on the primary winding located on the member A, the transformer action will still continue to occur because the secondary coil located on the rotatable part between D1 and D2 and the primary coil are magnetically and mutually coupled lo each other by closed magnetic circuit as shown in FIG. 1B. The primary coil located on member A is able to transfer power to the secondary coil located on the member D between D1 and D2 without the influence of any rotation}effect of the secondary coil because practically the safe amount of mutual flux linking the primary coil will also link the secondary coil whether the secondary coil located on the rotatable shaft is stationary or rotating around axis X1, X2. This unique magnetic circuit will provide a true transformer action between the stationary primary and rotating secondary unaffected by the magnitude of the rotational speed, and the direction of rotation or angular position of the secondary coil. It is this technique of maintaining a practically constant mutual flux between the primary winding and the rotating secondary winding independent of the relative angular position between the two coils which is achieved by designing a novel and unique magnetic circuit that makes the operation of the brushless power unit possible. Those skilled in the art will recognize the fact that the result of this new design technique to create a special magnetic circuit is that the brushless power unit rotor flux does not change with change in relative angular position between the stator and the rotor. The resulting effect on the performance characteristic of the brushless power unit designed in accordance with the teaching of the present invention is that the rotor voltage, current, and frequency does not vary with the rotor speed or the rotational slip between the stator and the rotor.

Having thus described the brushless power unit the principle of electronic commutation which is necessary for a brushless operation of the motor can be explained by the following example and description. Consider a rotating armature having multiple coils. Each coil is alternately connected to a DC source located on rotor by two pairs of switching transistors. The first pair connects the coil to the DC source in a selected voltage polarity so as to circulate current in a desired direction. The second pair connects the coil lo the DC source, in opposite voltage polarity lo that of the first pair. As a result, the direction of the current flow, now, is in the opposite direction to that when the first switching pair connects the coil to the DC source.

Both the pairs of switching transistors controlling each coil is controlled by one phototransistor located al the same angular position on the rotor where the coil which it controls is located. The phototransistor controlling the switching transistors conducts when a light is incident on the phototransistor and slops conducting when the incident light radiation is turned off. When the phototransistor conducts as a result of incident light on it will be observed by the reader that it will output one logic slate, determined by the output connection. This will switch one pair of switching transistors and as a result the coil will conduct current in a selected direction. Likewise, when the phototransistor is turned off, it will output an opposite logic state, to that when it is conducting. This will switch the other pair of switching transistors in to conduction and thus conducting the current in the opposite direction lo that when the first pair of switching transistors are conducting. It is this technique of predefined switching of the coil current in two opposite directions that will make electronic commutation possible without the use of any mechanical device.

A stationary disc is located on the stator and is interposed between the phototransistor and a light source. The light source activates the phototransistor when the phototransistor receives the light radiation form the light source. The light source and the phototransistor are both located on the rotor. As the phototransistor and the light source rotates with the rotor, the disc, by virtue of its position between the light source and the phototransistor has the ability lo either allow the phototransistor lo conduct by allowing the light radiation from the light source to reach the phototransistor or slop the phototransistor from conducting by obstructing the radiation from the light source to reach the phototransistor during any desired angular position of the rotor.

FIG. 1C shows a shunt motor with an arrangement of the stator and rotor where a rotor rotates between a pair of north and south poles of said two pole shunt motor. N1, N2 defines the magnetic neutral axis between the two field poles. Consider a rotor coil with two coil sides Cl and C2. The coil is energized lo circulate current in a given direction by a pair of switching transistors as indicated by the current direction in C1 and C2 as shown in FIG. 1C. According Flemings left hand rule of motor action, the resulting direction of rotation produced by the interactionn of coil currents and the field poles will be anticlockwise. The two coil sides C1 and C2 will continue to produce torque until the two coil sides reaches the field pole neutral axis N1, N2. When in the neutral axis area, due to absence of magnetic field, the two coil sides C1 and C2 will not produce any noticeable torque. The two coil sides, C1 and C2, however will go past neutral axis if the rotation of the rotor continues due to the intertia of the rotor and torque produced by other coils located on the rotor. If the direction of the current in the two coil sides C1 and C2 remains the same past the neutral axis N1, N2, then, according to Flemings left hand rule of motor action, the torque produced will be in the opposite direction to that of the rotation of the rotor. It is therefor necessary to reverse the direction of the current in the coil sides C1 and C2 to continue the torque in the same direction. This means that it is necessary to commutate current in each coil when the coil passes through the neutral axis between the two magnetic field poles.

The novel and unique method of electronic commutation according to the present invention is performed by two pairs of switching transistors, a disc and a phototransistor for each coil acting as rotor position sensor. The above elements in combination achieves this reversal of current or commutation in each coil to produce continuous torque in a desired direction by the rotor.

The total rotation of 360 degree, performed by the rotor of the two pole shunt motor per every revolution is divided into two approximate segments of 180 deg. each. The division is achieved by the field pole neutral axis N1, N2 as shown in figure. During one segment of 180 deg. of rotor rotation, the stationary disc allows the phototransistor to conduct by enabling the light radiation from the light source to reach the phototransistor. This we enable the phototransistor to output a selected logic level. FIG. 6 shows the connection method by which selected logic level is generated by the combination of the disk light source and the phototransistor. This generated output logic level by means of suitable control logic switches one pair of switching transistors. This will constrain the current in the coil to flow in one selected direction and thereby producing the torque in one selected direction.

During the second segment of 180 degree. of rotor rotation as defined by the neutral axis N1N2 the stationary disc prevents the light radiation to reach the pholotransistor and the phototransistor is thus not allowed to conduct. This will produce a logic level opposite to that produced by the first 180 Degree rotation of the rotor. This opposite logic will switch the other pair of transistors and thereby reversing the direction of the current flow in the coil, which will continue the torque in the same direction.

When the Flemings left hand rule of motor action is applied to the coil described and illustrated above as shown in FIG. 10, it will be observed that a continuous torque is produced by the rotor, when the coil current is switched in opposite direction every time the coil passes through the field pole neutral axis between any two opposite poles.

One more new area of application opened by the present invention is the brushless polyphase AC motors able to operate at variable speed and at leading power factor.

In the brush type polyphase AC motors, slip-frequency voltage is injected in the rotor by brush pairs equal lo number of pole pairs per eaoh phase. Thus to implement electronic commutation in light of the teaching of the present invention, for a two pole machine having one coil per pole each coil will require four switching transistor and one phototransistor for commutation. Eaoh phase will require one brushless power unit lo supply power lo the rotor.

Another concept introduced by the present invention is the disc type rotor synchronous and DC machine. In the prior art the direction of flux to and from rotor to stator is radial. The power rating is determined by the product of the square of the diameter and length of the rotor. The new concept according to the present invention the direction of the flux from stator to rotor is along the axis of the machine. The rotor winding is located the side of the disc type rotor where the radial slots are generally perpendicular to the direction of the shaft. This arrangement dramatically reduces the weigh and size of the machine by greatly reducing the axial length of the machine.

The major driving constraints that distinguishes any invention superior to prior art are cost performance size weight and reliability and maintenance advantages that can be derived by introducing this new invention. The prior art brushless machines have some serious limitations and disadvantages. One of the primary objects of the present invention is to offer a brushless motor, both capable of operating on AC or DC in all its configurations.

Another object of the present invention is lo offer a cost effective brushless electronically commutated polyphase AC color capable of operating at leading power factor and variable speed having higher starting torque than prior art motor. This type of motor does not exist in the prior art.

Yet another object of the present invention is to offer a cost effective and efficient DC excitation system for synchronous machines which overcomes all the performance, size and other serious limitations and disadvantages of the prior art excitation systems.

An additional object of the present invention is to provide a cost effective brushless means lo transfer power or signal lo a rotating device from a stationary source.

BRIEF DESCRIPTION OF THE DRAWINGS

FIG. 6 shows the DC motor commutation scheme.

FIG. 7 shows the scheme to detect the neutral axis to carry out commutation.

FIG. 8 shows the trace opening and the sensor disc.

DETAILED DESCRIPTION OF THE INVENTION

The rotating electrical machine architecture proposed in the light of the present invention focuses on the brushless power unil as its central member. In view of this fact the detailed description of the invention will first begin with the brushless power unil. The brushless power unit will be first illustrated and described in delay. Four different embodiments of the brushless power unil will be described. Each embodiment of the brushless power unil will be described in such a manner so as to emphasize special characteristic and advantage distinct and unique to that embodiment.

Modern design methodology relating to rotating electrical machines and magnetic circuit design is very well known and understood in the prior art technology. Many excellent books exist on the design of the rotating electrical machines magnetic circuit and transformer design. Therefore no attempt will be made to teach the principles of electrical machine design. AH the state of the art techniques lo improve performance and reduce cost would also be applicable lo the present invention.

It should be noled that the power output from the brushless power unit can be employed in a plurality of different applications. One of the applications of the brushless power unil will consist of a low cost DC excitation system for the synchronous machines. The output voltage of the rotating member of the brushless power uniting this type of excitation system application will be rectified and used for DC excitation of the rotating field system for the synchronous machines.

An important application of the brushless power unit will be a DC machine architecture employing electronic commutation. To further illustrate this type of architecture. an embodiment of a two pole DC shunt motor employing a brushless power unil to supply power to the electonically commutated armature coils will then be described.

Prior art AC polyphase machines bad some very useful and important characteristics. However, due to the brush problems as explained earlier, these machines could not be used for the applications it was once used. The brushless power unit offers a new machine architecture wherein a slip frequency voltage can be injected to a rotating or a stationary member of the polyphase machine. Two embodiments of a polyphase AC motor able to operate al variable speed and leading power factor using a brushless power unit and a electronic commutation to generate slip frequency voltages will then be finally described.

Figure 1A:
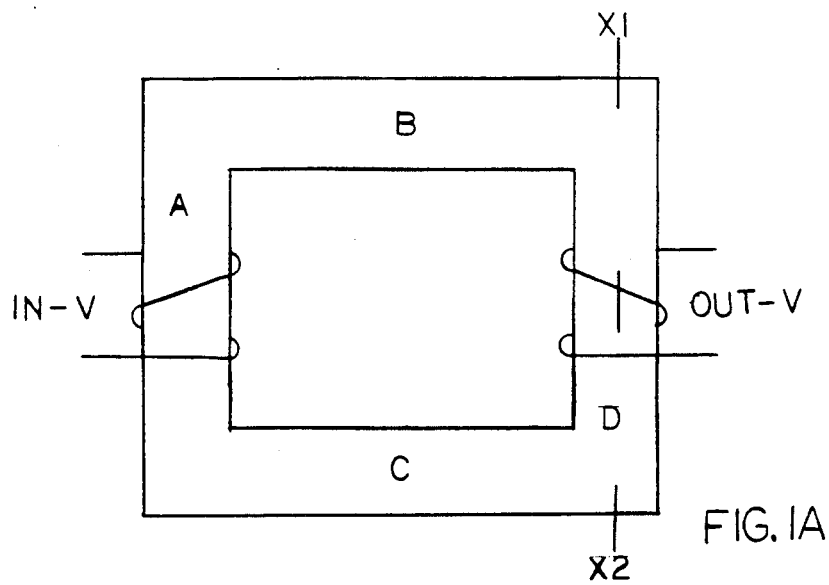
FIG. 1A shows the transformer illustration for the brushless power unit.
Figure 1B:
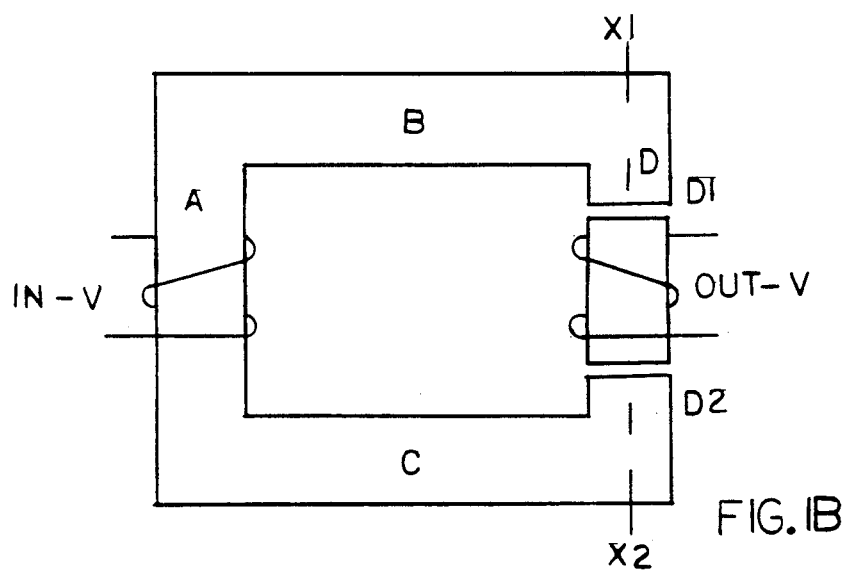
FIG. 1B shows a conceptual drawing of the brushless power unit.
Figure 1C:
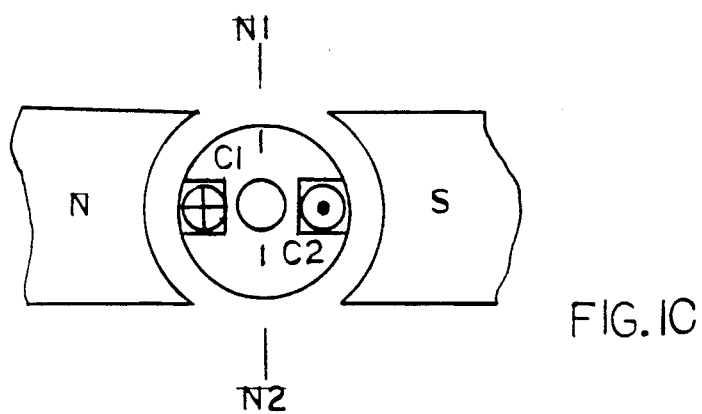
FIG. 1C shows the commutation concept employed in the motor design.
Figure 1D:
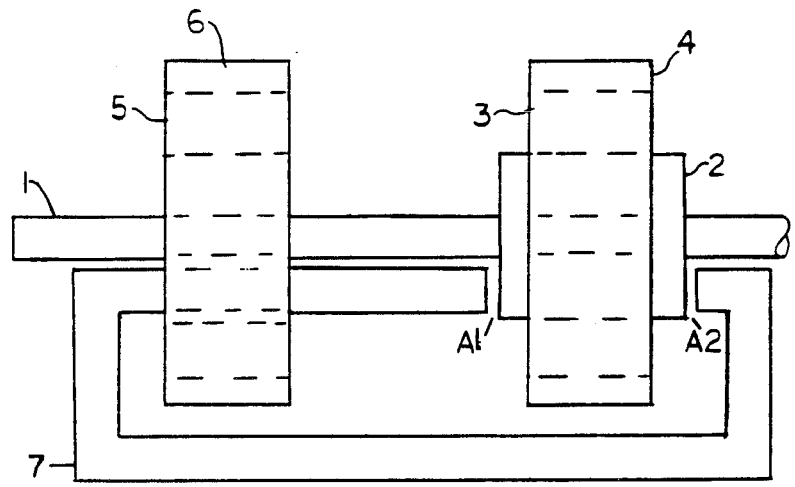
FIG. 1D shows one embodiment of the brushless power unit.

FIG. 1D shows one of the many embodiments of the brushless power unit which has been claimed in the present invention in light of the teaching of the present invention. The brushless power unit is generally an integral part of a DC or AC machine such as a brushless motor when used to supply power lo the rotating member of the motor. The rotating member of the brushless power unil, for this reason, is fabricated on the shaft of the motor of which the brushless power unit is the member. As shown in FIG. 1D, the motor or the rotating machine shaft l, is the machine element on which the rotating member of the brushless power unit is fabricated and located. To achieve this positioning of the brushless power unit rotor on the machine shaft 1, the rotor core 2, of the rotor is fabricated on the machine shaft 1. The most efficient and cost effective method of fabricating the rotor core 2 on machine shaft 1 consists of spirally winding a sheet of magnetic flux conducting material such as magnetic stamping sheet steel customarily used in the transformer manufacturing, on the rotating machine shaft 1. When the sheet steel is wound on the machine shaft 1, it forms a cylindrical core wherein the rotor magnetic flux can move axially along the machine shaft 1 as the shaft 1 rotates. The cross seotional area of the rotor core 2, along which the flux moves on the rotor remains practically constant during all angles of rotation of the rotor. On the rotor core 2 is fabricated rotor housing S which surrounds the rotor core 2. The purpose of the rotor housing 3 is lo hold the rotor coil 4 in position on the rotor core 2 against the cetrifugal and other rotational forces generated due to the rotation of the machine shaft 1. The rotor housing S is designed to withstand all the expected forces on the coil 4 and the rotor core 2. The rotor coil 4 is wound on housing 3. The coil winding techniques are well known in the art. As has been described in the preceding description. the rotor housing 3 comprising of rotor coil 4 is fabrioaled on the rotor core 2. As a result of this assembly the rotor core 2 mounted on the machine shaft l, and the rotor coil 4, mounted on the rotor housing S forms in combination. the secondary member of the brushless power unil. It is therefore necessary that the rotor coil 4 is fabricated on the rotor core 2 in such a manner that the rotor coil 4 will link most of the magnetic flux passing through the rotor core 2. As a result of this, when a time variant flux flowing through the rotor core 2 and further linking the rotor coil 4 a voltage is induced in the rotor coil 4.

Figure 10:
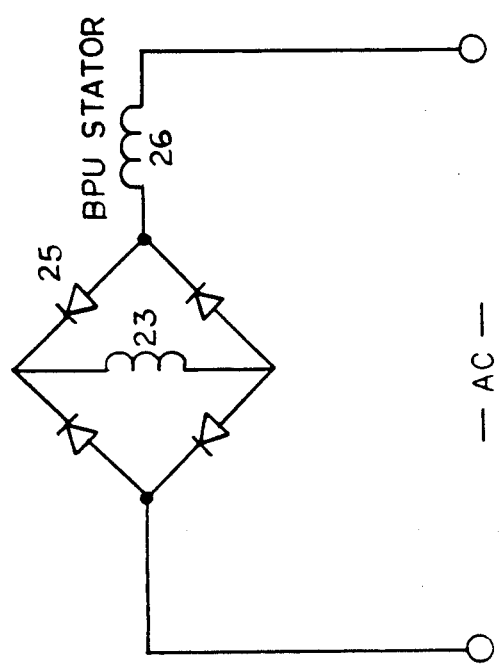
FIG. 10 shows a series motor connection employing the brushless power unit.

The stator is the stationary part of the brushless power unit and is located on the rotating machine or motor stator to which the brushless power unit provides the power. The stator coil G is wound on stator housing 5. The stator housing 5, and the stator coil 6, do not experience any centrifugal force such as experienced by the rotor coil and the rotor housing. However this assembly should be designed to withstand all the forces experienced by the stator. The stator housing 5 is positioned with respect to machine shaft in a manner that will allow the machine shaft to pass through the stator housing 5 on which is located and wound the stator coil G as shown in FIG. 1D. The brushless power unit stator coil housing 5 is attached to the motor housing. A stator yoke T is a part of the brushless power unit stator and is located on the stator of the brushless power unit. The stator yoke 7, as shown in FIG. 10 and in combination with rotor core 2, completes the magnetic circuit between the rotor coil 4 located on the rotating member and the stator coil 6 located on the stationary member of the brushless power unit. Those skilled in the art will recognize the fact that this unique magnetic circuit will mutually and magnetically link the two coils 4 and 6. The stator yoke 7 is an integral member of the brushless power unit stator and is made from a magnetizable material The object of the stator yoke 7 is to provide a continuous magnetic path which includes three sections. The first section of the stator yoke 7 forks an air gap Al with one side of the rotor core 2 and also passes through the stator housing 5 on which is located and wound the stator coil E. The second section of the stator yoke 7, forms a second air Sap A2 with the other side of the rotor core Z. The third section of the stator yoke 7 connects the first section and the second section of the stator yoke 7 at the remaining ends of first and second sections of the stator yoke 7, which does not form air gaps with rotor core 2. The stator yoke 7 is capable of carrying the same quantity of flux as rotor core 2 and is made from a magneto flux conducting material customarily used in the manufacture of transformers. The output leads from the rotor coil 4, is routed through the rotor core 2,in such a manner so as not to obstruct the rotation of rotor coil 2, by the stator core 7, generally by appropriate recess in the rotor core 2. It is evident from the description of the magnetic circuit that a compelled and closed magnetic circuit is formed in combination by elements which includes the rotor core 2 an air gap on one side of rotor core 2 a section of the stationary yoke 7 the second air gap on the other side of the rotor core 2 which finally links the rotor core 2 back lo stationary yoke 7. This closed magnetic circuit mutually and magnetically links the stator coil 6 and the rotor coil 4 providing a true transformer action between the stator and the rotor of the brushless power unit as claimed in the present invention.

From the preceding description of the brushless power unit and the underlying theory described earlier in the summary, it will become clear to the reader that a true transformer action exists between the stationary coil and the rotating coil of the brushless power unit. Generally the stator acts as the primary and the rotor coil acts as the secondary. However, as in any true transformer, il is also possible to transfer power from the rotor to the stator of the brushless power unit in applications that may require that mode of operation. As explained in the theory of the brushless power unil in either mode the magnitude and frequency of the induced voltage in the secondary member, transferred from the primary member is practically independent of the rotational slip between the stationary and rotating member.

Figure 2:
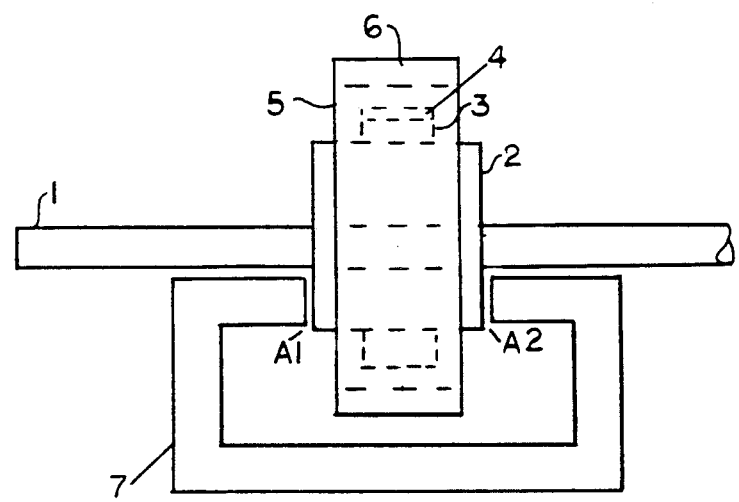
FIG. 2 shows one more embodiment of the brushless power unit with overlapping coils.

FIG. 2 shows another embodiment of the brushless power unit in accordance with the teaching of the present invention. In the design and the construction of this embodiment, the rotor coil 4 and the stator coil 6 overlap eaoh other in the overall assembly with the stator coil 6 surrounding the rotor coil 4. The primary advantage of this arrangement is reduced axial length of the brushless power unit.

As has been explained earlier in the first embodiment of the brushless power unit the rotor core 2 is fabricated on machine shaft 1 using any cost effective method such as spirally winding a sheet of magnetic steel on the machine shaft 1. On the rotor core Z is mounted a rotor housing 8 on which is wound rotor coil 4. The stator housing 5, on which is wound stator coil G surrounds the rotor coil 4. The stator coil 6 and rotor coil 4 are partially linked by the rotor core 2. The complete magnetic circuit, however, is formed by the rotor core 2, the two air gaps A1 and A2 on the two sides of the rotor core 2 and the stationary yoke 7. It should be noled that the yoke 7 does not pass through the stator housing 5 and the stator coil 6.

Figure 3:
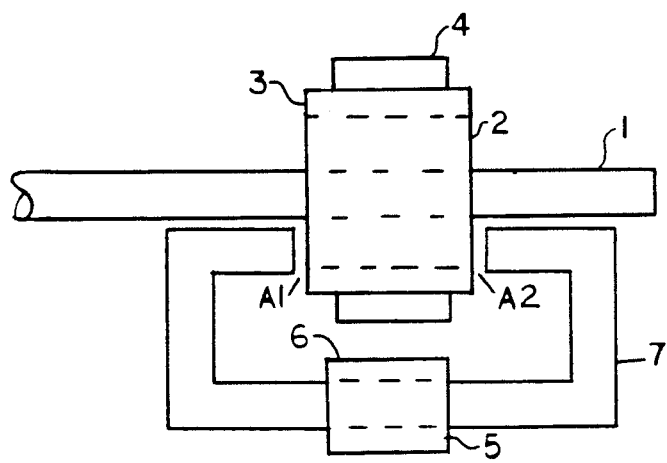
FIG. 3 shows one more embodiment of the brushless power unit with cylindrical core stator yoke.

FIG. 3 depicts one more embodiment of the brushless power unit. The rotor core 2 is fabricated on the machine shaft 1 by a suitable method as described earlier. On the rotor core 2 is mounted the rotor housing 3 on which is wound the rotor coil 4. The important feature of this embodiment is that the machine shaft does not pass through the stator housing 5 and the stator coil 6. A complete magnetic circuit linking the stator coil 6 and the rotor coil 4 is formed by the rotor core 2 an air gap on one side of the rotor core 2 the stationary stator yoke 7 and the second air gap on the other side of the rotor core 2 which links the circuit back to the stator yoke 7. The stator housing 5 and the stator coil 6 are both fabricated on the stationary yoke 7. The yoke 7 passes through the stationary housing 5 and the stator coil G. The stator coil 6 and the rotor coil 4 are mutually and magnetically coupled by the rotor core 2 and the stationary yoke 7 linked together by two air gaps A1 and A2 on the two sides of the rotor core 2. The specific advantage of this embodiment is that more than one stationary yokes can be fabrioaled with smaller coils wound on it.

Figure 4:
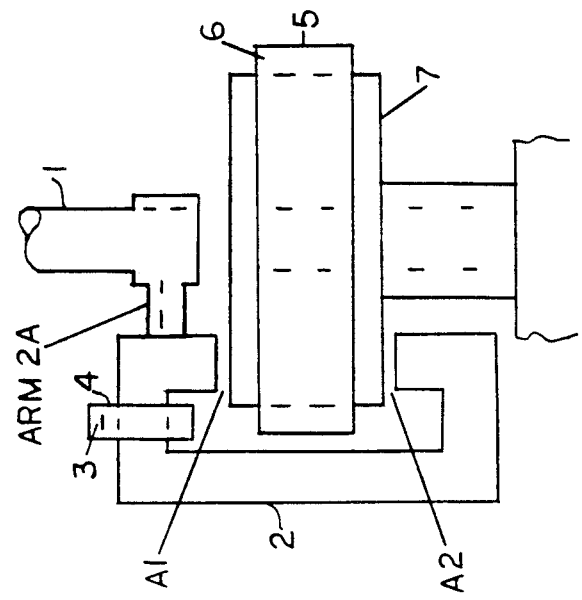
FIG. 4 shows one more embodiment of the brushless power unit which can employ more than one stator yoke.

FIG. 4 depicts one more embodiment of the brushless power unit. The rotor core 2 is not directly fabrioaled on the machine shaft as is done on the previous embodiments. On shaft 1, is mounted an arm 2A, by a suitable method as shown in FIG. 4. Rotor yoke 2, moves with the arm 2A. Rotor coil 3,is wound on rotor housing 4, which is mounted on the rotor core 2, which is not concentric with the shaft, 1. On the rotor core 2 is mounted the rotor housing 4 on which is wound the rotor coil 3. The stator yoke 7, consists of spirally wound magnetic steel sheet in the form of a hollow cylinder as shown in FIG. 4. The cylindrical yoke 7 is supported from the inside so as not lo obstruct the movement of rotor core 2, as shown in FIG. 3. The stator coil G is able to drive the flux through the rotor core 2, and the air gaps A1 and A2 between the rotor core and the stator yoke 7. The stator coil G, is wound on the stator housing 5, located on the hollow cylindrical yoke. The important feature of this embodiment is that the machine shaft does not pass through the stator housing 5 the stator coil 6, and the rotor coil 4. A complete magnetic circuit linking the stator coil G and the rotor coil 4 is formed by the rotor core 2, mounted on the arm 2A an air gap A1 on one side of the rotor core 2, the stationary hollow cylindrical stator yoke 7 and the second air gap A2, on the other side of the rotor core 2 which links the circuit back to the stator yoke 7. The stator housing 5 and the stator coil 6 are both fabrioaled on the stationary yoke 7. The yoke 7 passes through the stationary housing 5 and the stator coil G. The stator coil 6 and the rotor coil 4 are mutually and magnetically coupled by the rotor core 2 and the stationary yoke 7 linked together by two air gaps A1 and A2 on the two sides of the rotor core 2. It is also possible lo use air in place of stator yoke so that a coil wound on the housing 5, without the spirally wound stator yoke 7 link the rotor coil. The specific advantage of this embodiment is that an air core stator can be employed without iorn in the stator with coils wound on it.

As has been described earlier, the brushless power unit transfers power from a stationary source lo a rotating member independent of the effects of the rotational speed of the rotor on output voltage and frequency. This properly of the brushless power unil can be effectively used to obtain a DC machine architecture that will allow a true brushless operation.

The power output from the rotor of the brushless power unit mounted on a DC motor shaft can be used to achieve brushless DC motor operation by providing the power to the armature coils of the DC motor from the rotor of the brushless power unit located on the same shaft and implementing electronic commutation of the current in the motor armature coils by suitable means.

An embodiment representing a machine architecture of a brushless DC shunt motor in accordance with the teaching of the present invention will be considered and described in detail lo illustrate the application of the brushless power unit to DC machine.

A two pole DC shunt motor with a field winding and armature is provided with two coils and four slots in the armature wherein each coil is located and wound in two slots each of the armature.

Two coils located in the four slots of the armature will be controlled to implement electronic commutation by four transistors provided per eaoh coil. To perform electronic commutation in each coil, each pair of power transistors will switch volatile of opposite polarity to drive current in the opposite direction through the coil. To further control the power transistor and lo electronically commutate the current in each coil, each pair of power transistors will be switched by a sensor such as one phototransistor provided for eaoh coil. The phototransistor controlling the two pairs of power transistor which in turn controls the current through each coil is located al the same angular position on the armature as the coil the phototransistor will control and switch.

The phototransistor provided for eaoh coil will be activated in to conduction and deactivated out of conduction by a light source located on the sensor disc.

Figure 5:
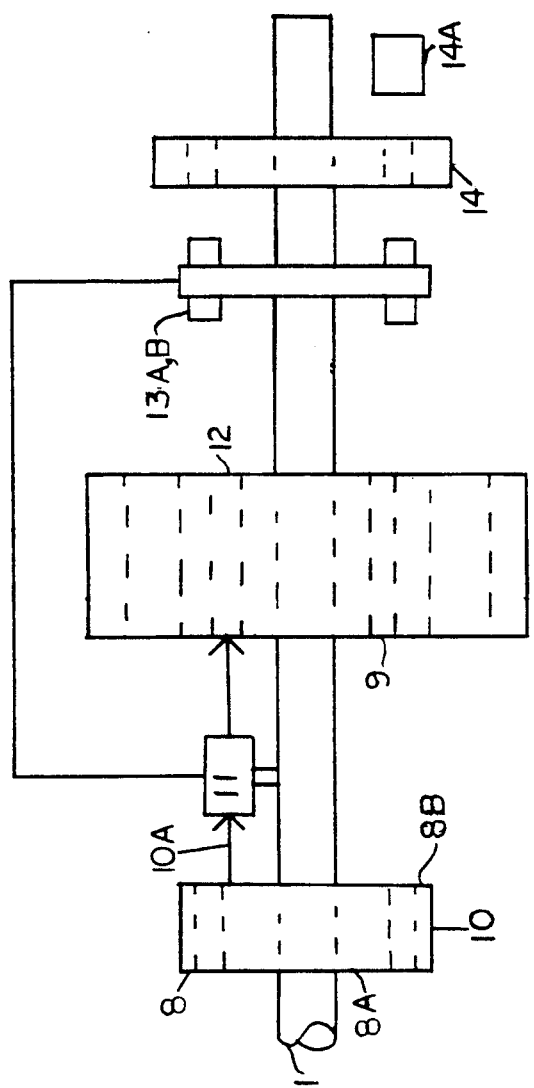
FIG. 5 shows the general layout of the brushless motor.

FIG. 5 shows in a general layout the main components of a two pole DC shunt motor. The layout illustrates the application of the brushless power unit employed to transfer power lo the armature of the DC shunt motor in accordance with the teaching of the present invention. Also illustrated is the principle of electronic commutation as described earlier, in the light of the present invention. The DC motor armature is provided with four slots in the armature and two coils are wound in the four slots of the armature. Each coil is located and wound in two slots of the armature.

On the DC motor shaft 1 is mounted the rotor 8A, of a brushless power unit 8, while the statoor 8B of the brushless power unit is magnetically coupled with the rotor 8A of the brushless power unit . Also located on the same shaft 1 is the armature g, comprising the armature coils 12 of the DC shunt motor. A source of AC voltage 10 is connected to the stator 8B of the brushless power unil 8. The stator 8B of the brushless power unit 8 transfers AC power to the rotor 8A of the brushless power unit 8 through rotating transformer action. The AC output 10A from rotor of the brushless power unit is connected to the input of the timing and control unit 11, also located on the rotor shaft 1.

The function of the timing and control unil is to provide rectification of AC voltage obtained from the rotor of the brushless power unit and facilitate the switching of the current for commutation of the armature coils. The timing and control unit is described in more detail later in the description of the layout according to FIG. 5.

The DC output 10A energizing the armature coils rectified from the timing and control unil 11, is connected to the switching elements that controls the direction of the current in the two armature coils denoted by 12. The two armature coils 12, provided on the armature of the motor are located in the four slots of the DC motor armature. The timing and control unit 11 also receives armature status inputs indicating the position of the armature coils with respect lo the motor field poles, from the phototransistor 13A and 13B. To receive the armature status inputs from the phototransistor l3AC3B the output of the two pholotransistors 13A and 15B is connected lo the input of the timing and control unit 11. The sensor disc 14 interfaces with phototransistor 13A and 138 without any physical contact and contains a light source 14A which activates and deactivates the photo transistors 13A and 13B, as the armature rotates. During the rotation of the rotor armature the angular position during which the light source 14A located on the sensor disc 14 will activate or deactivate the phototransistors 13A138 will depend on the position of eaoh coil with respect to the neutral. axis between the two field poles of the DC shunt motor.

FIG. 5 shows a timing and control unit 11, which is located on the machine shaft 1. The function of the timing and control unil 11 is two fold. First, provides rectification of the AC output voltage from the brushless power unil rotor 8A which is fed lo the armature coils 12, and while providing rectification, it also handles the dissipation of the heat generated from the rectifier units Secondly il houses and provides a control logic circuit that generates precise timing and control signals necessary to switch the power transistor elements lo control the direction of the current in the armature coils and thus implement electronic commutation of the armature coils, necessary in accordance with the teaching of the present invention.

FIG. 6 shows the circuit connections of the timing and control unit. The AC output 10A from the brushless power unit rotor is connected to the rectifier unit 15. The rectifier unit DC output is 15A. The rectifier unit DC output is connected to one side of four semiconductor switching devices such as high power transistors 16A to 16D. It is evident from the connection diagram of figure G, that when the two power transistors 16A and 16B are conducting the terminal Al of the coil A is connected to the positive of the rectifier unit 15. And the terminal A2 of the coil A is connected to the negative of the rectifier unil 15. This will drive the current through the coil in one direction.

In a similar manner, when the power transistors 16C and 16D, are switched into conduction, the power transistors 16C and 16D connects the positive of the rectifier unit 15 lo terminal A2 and negative of the rectifier unit lo the terminal Al of the coil A. This switching sequence will reverse the direction of the current fowl in the coil A as shown in FIG. 6. This will effect the required commutation of the current in the coil A.

FIG. 7 shows the phototransitors 13A and 138 that switches the armature coils A and 8 and thereby the current in the two coil sides of the armature coils A and B FIG. 7 also shows scheme that indicates the relative position of the phototransitors 13A and 18B with respect to the field pole neutral axis N1,N2. As slated earlier, the armature coils A and B are located in the four slots of the armature. As further shown in FIG. 12 A1 and A2 are the two coil sides of coil A while B1 and B2 are the two coil sides of the coil B.

The pholotransistor 13A is located at the same angular position on the armature where coil side Al is located. Because of this unique positioning of the phototransistor 13A with respect to the coil A, the coil A and the phototransistor 13A crosses the neutral axis NlN2 at the same time. Likewise, phototransistor 13B is located at the same angular position on the armature where coil side B1 of the coil B is located. This will constrain the phototransistor 13B and coil 8 to cross the neutral axis NlN2 al the same time.

Field pole coils 17 are wound on field pole 18.

FIG. 8 depicts the scheme showing the mechanics of movement of the phototransitors 13A and 13B relative to the sensor disc 14 whereby the phototransistors 13A and 138 receive activating signal from the stationary sensor disc 14. This will enable the phototransistor to switch the armature coils A and B lo effect commutation. On sensor disc 14 is located a trace opening kg through the sensor dsoi 14 forming a circular arc. The phototransistors 13A and 13B are located at such a radius on the armature that the phototransistors moves over the trace opening as the armature rotates. Behind this trace opening is located a light source 14A. This light source by means of light radiation activates the phototransistor sensors 13A and 13B as these sensors move over trace opening 19 during rotation of the armature on one side of the neutral axis NlN2.

As the armature continues lo rotate the sensors 13A and 13B crosses the neutral axis NlN2, and moves lo the other side of the neutral axis NlN2. On the other side of the neutral axis the sensors will interact with the section o& the sensor disc 14 where the trace opening is absent. It will be observed by the reader that due to the absence of trace opening when the sensors move to the other side of the neutral axis NlN2 phototransistor 13A and 13B will not receive light radiaton from the light source and as a result the phototransistors 13A and 138 are deactivated which will force them to switch out of conduction. When the phototransistor are constrained lo be deactivated the phototransistors 13A and 13B will output a logic level which is opposite to the logic state when pbototransitors 13A and 13B are activated. This change in logic state is utilized to perform commutation when phototransitors 13A and 13B moves on the opposite side of the field pole neutral axis NlN2.

Those skilled in the art will understand the fact that phototransistor 13A and 13B are not capable of switching the power devices directly due to insufficiently drive capability of these devices. The phototransistor 13A and 13B therefor requires an inverter, INV and a driver device DRV as shown in FIG. 7 to switch power transistors 16A to 16D in to proper state of conduction.

The commutation of current in eaoh coil is to be preformed every time the coils A and B passes through the neutral axis NlN2. As shown in FIG. 7 it will be observed that when Al of coil A is on N pole side of the neutral axis NlN2, the light source 14A will activate phototransistor 13A and thereby switching power devices LA and 16B. with the further rotation of the armature. A1 moves lo S pole side of the field pole neutral axis NlN2. As a result of this since there is no light source on the other side of the neutral axis NlN2, the phototransistor 13A will now be deactivated. This will invert the output logic slate of 13A and cause switching of power devices 16C and l6D into conduction and thereby reversing the direction of the current flow in the coil A, which is necessary to continue the torque in the same direction.

A transient suppressor 20 is provided to suppress switching transients generated during the switching of the power devices.

Identical to coil A four more transistors and a driver and an inverter are used to switch coil B. The circuit connection is made in an identical manner to coil A shown by 21. The switching signal however is provided by phototransistor 13B.

The sensor and light source can both be located on rotor with stationary sensor disc between the two or sensor disc itself can contain the light source.

Figure 9:
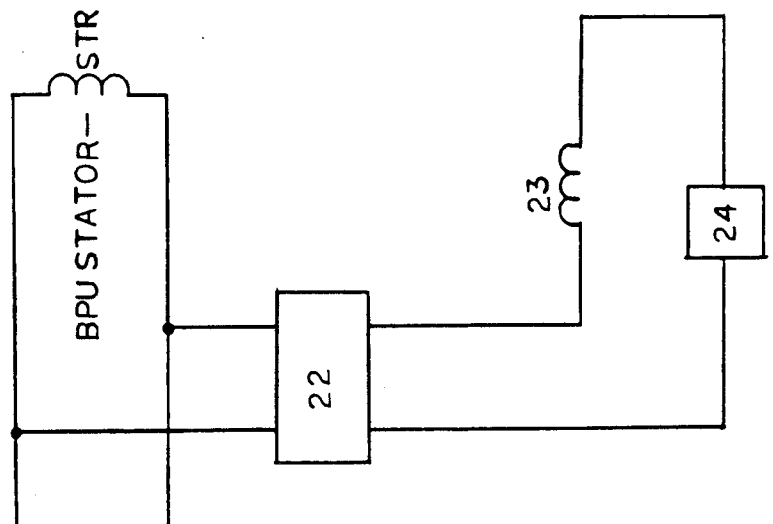
FIG. 9 shows a shunt motor connection employing the brushless power unit.

FIG. 9 shows how in a brushless DO motor a shunt connection of the armature and the field coil of the motor can be achieved by employing a brushless power unit. The AC supply from the line is connected directly to the stator STR of the brushless power unil. The secondary or the rotor of the brushless power unil will supply power to the armature coils. AC supply is also fed to the input of the field coil rectifier unil 22. The DC output of 22 is fed to fi(R)}d coils 23 through a series speed control resistor 24 which control the speed of the shunt rotor by controlling the field current. The connections described above connects the armature and field of the motor in shunt mode giving shunt performance characteristics to the DC motor.

FIG. 10 shows how in a DC motor a brushless power unit supplying power to the armature coils can be connected in series with the field coil to operate the armature and the field coil in a series motor configuration. when so connected, the motor functions as a series motor and provides series motor performance characteristics. A bridge rectifier unit 25 and fied) coil 23 are connected in series with a brushless power unit stator 2G as shown in FIG. 10. This will connect the armature and field coils of the motor in series giving series motor performance characteristics.

Figure 11:
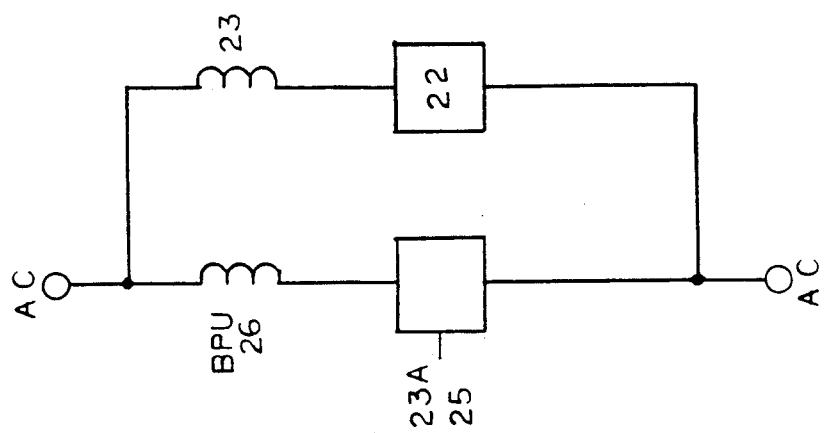
FIG. 11 shows a compound motor connection employing the brushless power unit.

FIG. 11 shows a DC coilpound rotor employing a brushless power unit where shunt field 23 with rectifier unil 22 is connected in shunt or parallel while the series field 23A and a bridge rectifier unit 25 are connected in series with a brushless power unit stator 26. The armature coils are connected to the secondary or the rotor of the brushless power unil. The above connection of the brushless power unil stator will result in the series field 23A being coonnected in series with the armature and the shunt field 23 in parallel wilb the armature to give compound characteristics to the DC motor.

Figure 12:
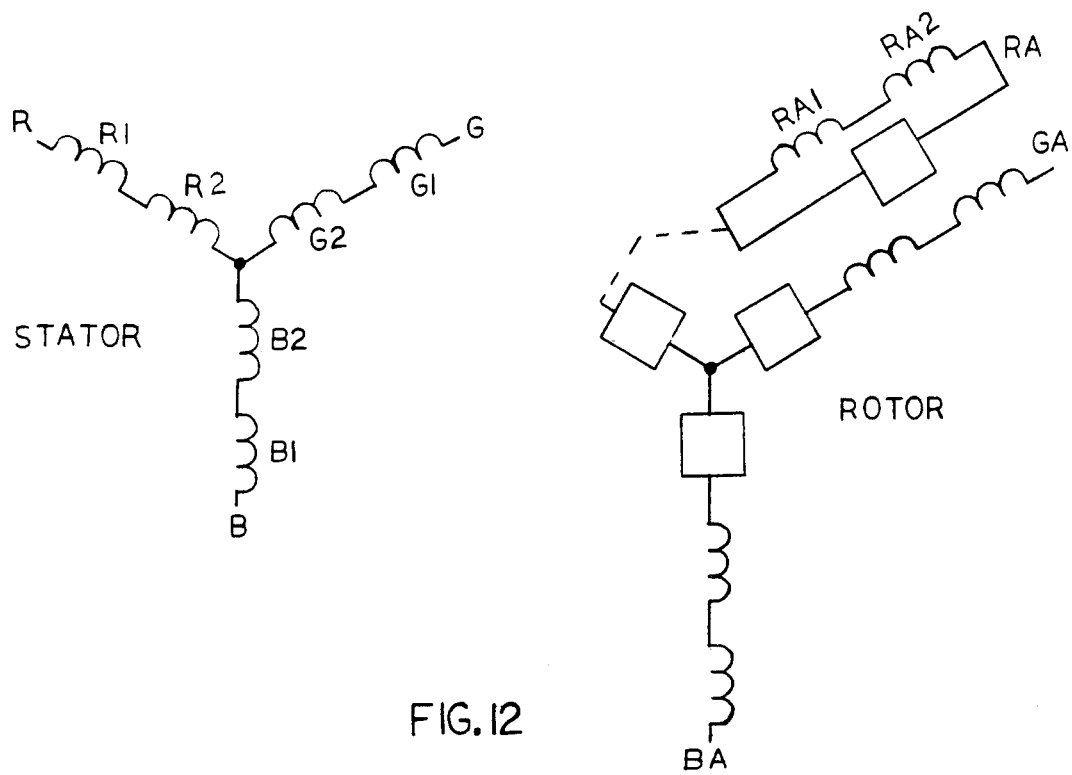
FIG. 12 shows an embodiment of the AC polyphase motor.

The brushless polyphase AC machine architecture in accordance with the teaching of the present invention is configured around a plurality of brushless power units working in combination with a means to electronically coil mutate the AC polyphase voltage lo generate slip frequency AC current. The slip frequency supply can either be injected in a rotating member or to a stationary member from a rotating member generating the slip frequency current. A brushless polypbase AC motor provided with a suitable means to electronically commutate supply frequency voltage to slip frequency voltage on the rotating member is as shown in FIG. 12. The rotor of the machine is able to generate and accept slip frequency AC voltage from the supply lines by employing three brushless power units and electronically commutating circuit is further shown in FIG. 12. FIG. 12 also shows a circuit configuration of a three phase AC rotor supplied with supply frequency to the stator of the machine and to the stationary member of the brushless power unit.

The slip frequency AC voltage injected to the three phase rotor of the AC polyphase motor produced by means of three brushless power units and the electronic commutating circuit integrals with the rotating field produced by the stator of the AC polyphase rotor to generate rotational torque in the rotor of the AC polyphase motor.

A two pole AC polyphase motor operating from a three phase supply lines will be considered for detail description of the candidate embodiment representing the concept of the machine architecture based on the teaching of the present invention. The stator connection of the two pole, three phase motor under consideration comprises three phases wound on the stator slots and are denoted by R, G, and B as shown in FIG. 12. The AC polyphase brushless rotor stator is further equipped with one coil per pole per phase. As shown and further illustrated in FIG. 12 R1R2 G1, G2 and B1,B2, are six stabor coils which are connected in a Y connection to form a 3 phase stator winding system. The stator is directly connected to a three phase supply lines.

Figure 13:
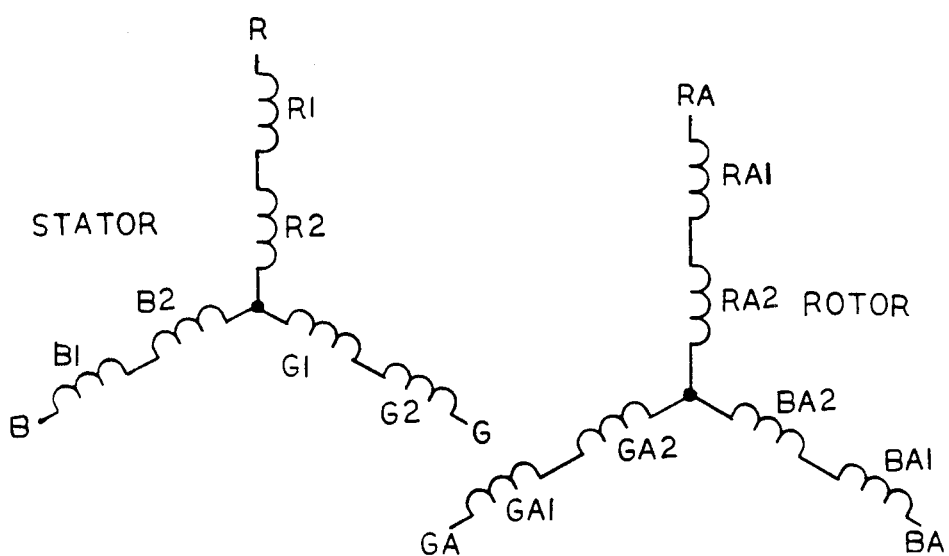
FIG. 13 and 14 show an embodiment of the AC polyphase schrage motor.

The AC polyphase rotor is provided with a rotor as shown. The power input lo the rotor is provided by three single phase brushless power motor. The rotor of the AC polyphase rotor is provided with a two pole three phase rotor winding in the rotor slots. The rotor winding comprises one coil per pole per phase. The six coils forming the rotor winding are denoted by RA1-RA2 BA1BA2 and GA1, GA2 are also shown in FIG. 13. In order to generate slip frequency AC voltage in the rotor, eaoh phase of the rotor of AC polyphase rotor is connected to rotor output of one brushless power unit by means of four AC semiconductor switching devices. The four semiconductor switching devices are connected between each rotor phase of AC polyphase motor and corresponding brushless power unit of identical phase so as to perform commutation of current in eaoh phase winding as desired.

The theoretical development of the electronic commutation techniques in accordance with the teaching of the present invention has been described in complete detail in the summary of the present invention. The actual hardware and process of commutation in the individual coil of AC polyphase rotor is implemented as explained earlier for the rotor of DC the shunt motor. The commutation hardware comprises one phototransistor for eaoh rotor phase of the AC polyphase rotor controlling four semiconductor switching devices which controls power lo eaoh phase of the AC polyphase rotor. The phototransistor moves with the rotor, tracing a zone of light and a zone of dark located on a stationary sensor disc.

As noted earlier, eaoh rotor phase of the AC polyphase motor is connected to the rotor of one single phase brushless power unit by four AC semiconductor switching devices. In order lo inject a slip frequency voltage in the rotor of the AC polyphase motor the output voltage polarity of each brushless power unit rotor connected to eaoh phase is reversed by four AC semiconductor switching devices in a pre determined sequence. When the center of any given rotor phase crosses neutral axis between the two poles of corresponding stator phase, the output voltage polarity of the brushless power unit rotor connected to that phase is reversed by switching off the pair that is presently conducting out of two pairs formed by four AC semiconductor switching devices and switching on the pair that is not presently conducting. Thus when center of rotor poles defined by coils RA1 and RA2 crosses the neutral axis between stator poles defined by R1 and R2, the direction of current in the rotor coils RA1 and RA2 is reversed by reversing the output voltage polarity of the brushless power unil rotor connected to that phase.

It should be noled that the output voltage generated from a rotor of a brushless power unil is 180 degree out of phase with the stator input voltage of the same brushless power unit. It is therefore important that the switching of the rotor coil to correct voltage polarity should be adjusted in the commutation.

Tracing the path and polarity of the two rotating fields produced by the rotor and the stator of the AC polypbase motor, it will be observed by the reader that when the rotor coils are commutated as described in the foregoing description and scheme, the injected voltage to the rotor of AC polyphase rotor is maintained at slip frequency determined by the rotational slip between the stator and the rotor of the AC polyphase motor. Any detailed text book on AC polyphase commutator motor will be useful in understanding and comparing the function of the brushless AC polyphase rotor claimed in the present invention over the prior art machines.

The operation of the rotor will be identical to a commutator type motor known in the art without the disadvantages of the brushes.

The speed is controlled by controlling the brushless power unit stator voltage and polarity. The power factor is controlled by the phase angle of the input voltage to the three brushless power units. AC these can be achieved by an induction regulator.

In a conventional prori art schrage type AC polyphase commutator motor the three phase supply voltage is fed lo a three phase windings located on the rotor instead of on the stator by means of three slip rings.

Also located on the rotor is additional commutator winding which is connected lo the commutator. A set of brushes per each pole pair is mounted on the commutator. The output of eaoh set of brushes is then connected to eaoh phase of a three phase stator winding located on the stator whereby a slip frequency voltage is injected in the three phase stator winding providing a motor action by interaction of the stator field and the rotor field. The speed and power factor is controlled by position of the brush on commutators which controls the voltage and phase input to the stator winding.

A brushless polyphase AC rotor provided with an electronically commutated rotating member able to output and feed slip frequency AC voltage to the AC polyphase motor stator employing a plurality of brushless power units is shown in FIG. 13. FIG. 13 shows a configuration of a three phase brushless schrage rotor in accordance with the teaching of the present invention. A three phase winging located on the rotor of the AC polyphase rotor is connected in Y mode of three phase connection. Directly connected to the three phase winding of the rotor of the AC polyphase motor is a three phase output generated from the three Y connected rotors of three brushless power units called mani brushless power units. No commutating means is provided between the AC output of the three main brushless power units and the three phase winding of the AC polyphase rotor. The three stators of the main brushless power units supplying power lo the rotor of the AC polyphase rotor are directly connected to the three phase supply ones at supply frequency.

To supply slip frequency voltage to the stator of the AC polyphase schrage rotor a separate three phase winding called additional winding is provided on the rotor slots of the motor. The output from this additional winding is commutated before being supplied to the stator of the AC polyphase schrage motor. It is also possible to take a portion of voltage from the three phase output generated from the rotors of the three brushless power units connected to the rotor winding of the AC polyphase rotor and commutate the voltage before being supplied to the stator of the AC polypbase schrage rotor.

The primary object of the present embodiment of the invention is to generate slip frequency voltage in the rotor of the AC polyphase schrage motor and inject this voltage in the stator of the same motor by employing three additional Y connected brusbless power units called commutating brushless power units. The commutating brushless power units operates in reverse order to generate the slip frequency voltage to be injected in the stator of the AC polyphase scrage rotor. The rotor acts as a primary member and the stator aots as the secondary member. The stator of the commutating the brushless power units are connected to the stator of the AC polyphase schrage rotor. This will provide the stator of the AC polyphase schrage rotor with the slip frequency supply. The input voltage supplied to the rotor of the commutating the brushless power units from the additional winding on the rotor of the AC polyphase sohrage motor is commutated before being connected to the rotor of the commutating brushless power units. As result of this, the output at the stator of brushless power units will be at a slip frequency. To inject a slip frequency voltage in the stator of the AC polyphase schrage motor eaoh rotor phase of the additional rotor winding of the AC polyphase schrage motor is connected to the rotor of one single phase commutating brushless power unit by four AC semiconductor switching devices In order to inject a slip frequency voltage in the stator of the AC polyphase motor, the input voltage polarity of eaoh brushless power unit rotor connected to each phase of the additional winding is reversed by four AC semiconductor switching devices in a predetermined sequence. When the center of any given rotor phase crosses neutral axis between the two poles of corresponding stator phase the output voltage polarity of the brushless power unil rotor connected to that phase is reversed by switching off the pair that is presently conducting out of two pairs formed by four AC semiconductor switching devices and switching on the pair that is not presently oonduoling. Thus when center of rotor poles defined by coils RA1 and RA2 crosses the neutral axis between stator poles defined by R1, R2 and the additional winding coils the direction of current in the rot coils RA1 RA2 and the additional winding is reversed by reversing the voltage polarity of the input to the commutating brushless power unit rotor, connected to the additional winding on the phase as illustrated and shown in FIG. 13.

Figure 14:
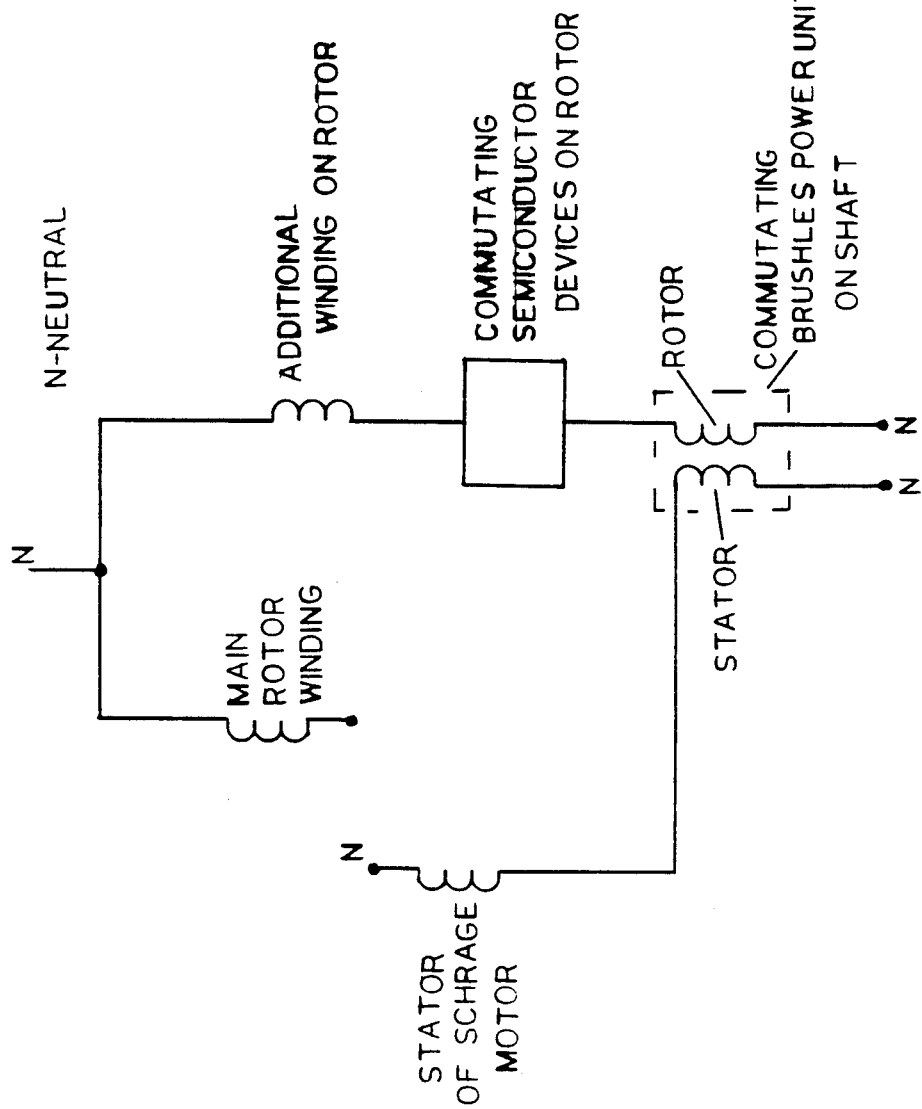

FIG. 14 shows a one phase connection of the three phase motor showing the additional winding commutating brushless power units and the connection to the stator of the AC polyphase schrage motor.

It should be noted that the output voltage generated from a rotor of a brushless power unit is 180 degree out of phase with the stator input voltage of the same brushless power unit. It is therefore important that the switching of the rotor coil to correct voltage polarity should be adjusted in the commutation.

Tracing the path and polarity of the two rotating fields produced by the rotor and the stator of the AC polyphase motor, it will be observed by the reader that when the additional winding rotor coils are commutated as described in the foregoing description and scheme the injected voltage to the stator of AC polyphase sohrage rotor is maintained al slip frequency determined by the rotational slip between the stator and the rotor of the AC polyphase sohrage motor. Any detailed text book on AC polyphase commutator rotor will be useful in understanding and comparing the function of the brushless AC polyphase sohrage motor claimed in the present invention over the prior art machines.

The operation of the rotor will be identical to a commutator type motor known in the art without the disadvantages of the brushes. The speed and power factor of the rotor is controlled by a device connected between the commutating brushless power unit and the stator winding that can control the phase angle, amplitude and polarity of voltage applied to the stator winding.

Figure 15:
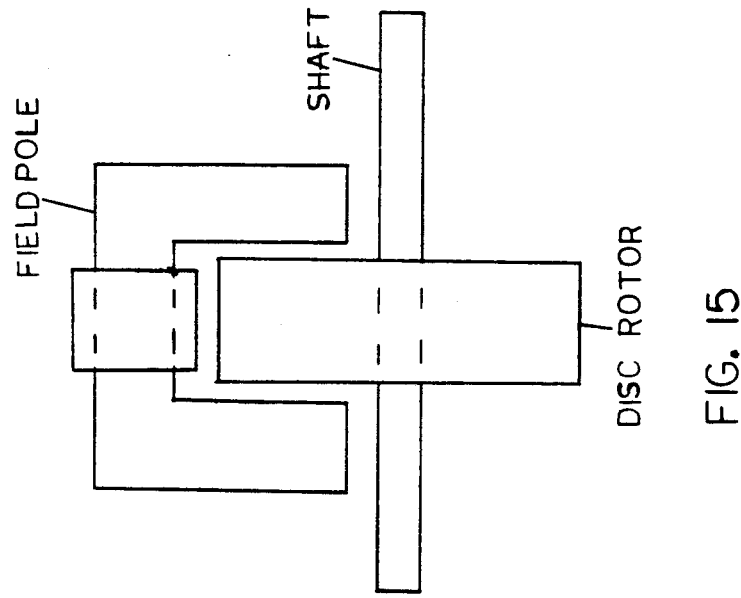
FIG. 15 shows a disc type rotor machine.

FIG. 15 shows a disc type rotor machine which is sefl explanatory.

CONCLUSION AND SUMMARY OF ADVANTAGES

The new concept in the field of brush]ess machine architecture introduced by the present inventor in the design of the brushless electrical machines represenls a major mile stone in the ongoing development of the electrical machine technology. The strength and superiority of any new invention over prior art is judged by the advantages it confers to overcoil the limitations and disadvantages of the prior art to which it pertains and degree to which it advances the state of the prior art technology. The advantages sought and gained will be in the area of reduction of cost improvement in performance decrease in size, weight and the positive impact it makes on the environment.

The present invention successfully achieves above objectives to enrich and further advance the state of art in brushless electrical machine technology. The advantages and the superior performance conferred by the present invention allows the new brushless machines to meet the requirements of new advanced applications not within the performance capabilities of the prior art brushless machines.

The advantages that distinguishes the unique characteristics and elements of the present invention over the prior art machines can be finally summarized in the following conclusion.

The central member of the present invention is a rotatable transformer designated in the present invention as a brushless power unit. The brushless power unit is employed in a number of applications because of the ability to transfer power to the rotating member of a machine without any difficulty and degradation in performance. This ability is not present in the prior art machines.

The function and construction of the brushless power unit that eliminates the limitations and the disadvantages of the prior art rotatable transformers in terms of size can be attributed to the fact that the brushless power unit can be constructed with as few as only one stator coil and only one rotor coil and no stator or rotor slots at all. Because of this reason the size of the brushless power unit can be effectively kept within practical and economical limits.

The operation of the prior art phase wound rotatable transformer consists of the rotor poles mutually linking the stator flux in such a manner that the flux linked by the robor coils changes with the change in angular position between the rotor coils and the stator poles. Because of this, the robor frequency and rotor output voltage changes with the change in rotor speed or the slip between the stator and the rotor. This causes many problems in the successful application of the rotatable transformer to the rotating machines based on the rolalable transformers. The rotor operation at speed above the synchronous speed is not possible The brushless power unit in accordance with the teaching of the present invention, however, operates independent of the slip between rotor and the stator. It can operate from zero speed lo many times the synchronous speed determined by the number of stator poes.]ll can also operate efficiently in either direction of rotation without any reversal or change in the polarity of the rotor voltage.

The ability of the brushless power unit lo transfer power is combined with a novel technique of electronic commutation to offer a number of brushless rotor machine architectures with unique performance characteristics not obtained with the prior art machines.

The brushless power unit asol permits a design of low cost excitation system for DC excitation of synchronous machines.

The spectrum of applications made possible by the brushless power unit in accordance with the teaching of the present invention represenls a major advanoement in the rotating machine technology. It will also create a new design philosophy in the optimization methods currently followed in the field.

While only some of the many possible embodiments of the present invention have been described and illustrated, this should not be construed as the limitations on the scope of the invention. Those skilled in the art will recognize the fact that it is possible to make various omissions and substitutions and changes in the details of the brushless power uniy and the related machines without departing from the true spirit of the invention. It is therefore the intention in the appended claims and their legal equivalents to cover as such possible modifications and alterations as may fall within the true spirit and scope of the present invention.

I claim:

1. A brushless rotating electrical machine for transferring power and having a shaft, comprising:

a rotor member means attached to the machine shaft and includes at least one rotor coil means and a rotor magnetic path means, wherein said rotor coil means is magnetically coupled to said rotor path means and the axis of said machine shaft passes through said rotor coil means;

a stator member means includes at least one stator coil means;

a stationary yoke member means made up of magnetic flux conducting material which forms at least one air gap with the rotor magnetic path means, said stationary yoke member means completes a closed magnetic circuit mutually coupling said rotor coils means and said stator coil means, said stationary yoke member means is disposed so as too allow free relative motion of said rotor member means with respect to said stator member means and said stationary yoke member means;

said stator member means magnetically couples with said rotor member means in such a way that said stator coil means and said rotor coil means overlap each other and the magnetic circuit is completed by said stationary yoke member means and said at least one air gap; and means for applying time variant voltage to the coil means of one of said member means, wherein a voltage is induced in the coil means of the other of said member means by virtue of mutual magnetic coupling between the coil means of the two member means and power is transferred from one member means to the other member means for use in said brushless rotating electrical machine.

2. The brushless rotating electrical machine as claimed in claim 1 wherein said stator member means magnetically couples said rotor member means through said stationary yoke member means, said rotor magnetic path means is made up of magnetic flux conducting material and passes through said rotor coil means and said stator coil means, and wherein said stator coil means is located in such a way that the magnetic circuit is closed by said stationary yoke member means passing through said stator coil means and by at least two air gaps.

3. The brushless rotating electrical machine as claimed in claim 1 wherein said rotor magnetic path means comprises a spirally wound sheet of magnetic flux conducting material around the machine shaft making up a cylindrical structure in which the flux travels along the axis of the machine shaft.

4. A brushless rotating electrical machine for transfer of power and having a shaft, comprising:

a rotor member means attached to the machine shaft and includes at least one rotor coil means and a rotor magnetic path means, wherein said rotor coil means is magnetically coupled to said rotor magnetic path means;

a stator member means includes at least one stator coil means, wherein the axis of the machine shaft passes through said stator coil means;

a stationary yoke member means forms at least one air gap with said rotor magnetic path means, said stationary yoke member means completes a closed magnetic circuit mutually coupling said rotor coil means and said stator coil means, and said stationary yoke member means is disposed so as to allow free relative motion of said rotor member means with respect to said statoor member means and said stationary yoke member means;

said stationary yoke member means comprises a cylindrical structure occupied by a means capable of carrying magnetic flux and is characterized by a hollow cylinder made up of spirally wound sheet of magnetic flux conducting material;

at least one rotating member attached to the machine shaft and forms said rotor magnetic path means by linking magnetic flux from one end of said cylindrical structure to the other end; and means for applying time variant voltage to the coil means of one of said member means, wherein a voltage is induced in the coil means of the other of said member means by virtue of mutual magnetic coupling between the coil means of the two member means and power is transferred from one member mans to the other member means for use in said brushless rotating electrical machine.

5. The brushless rotating electrical machine as claimed in claim 4 wherein said stator coil means is wound around said stationary yoke member means making up said cylindrical structure in which the flux travels along the axis of said machine shaft.

6. A brushless rotating electrical machine having a shaft, comprising:

an armature magnetic path means;

a motor armature means attached to the machine shaft and includes a plurality of coils located in a plurality with slots, said motor armature means is magnetically coupled to said armature magnetic path means;

a motor field member means includes a field pole means having a plurality of magnetic poles of opposite polarity with inner polar region located between two poles of opposite polarity, and is further disposed so as to receive said motor armature means which is able to be freely rotated inside the motor field member means, said rotor field member means includes a field magnetic path means;

means for transferring power between a rotating member attached to the motor armature means and a stationary member attached to the motor field member means, said stationary member and said rotating member forming a brushless power unit;

a timing and control unit for directing and controlling a power transfer between a source of power located on the machine shaft and the coils of said motor armature means, said timing and control unit comprises:

(1) a plurality of semiconductor switching devices connected between the coils of said motor armature means and said source of power, wherein said semiconductor switching devices drive the current through the coils of said motor armature means in desired direction by selectively switching said semiconductor switching devices into conduction and out of conduction;

(2) means for generating commutation signals, including a means for detecting the relative position of the coils of the motor armature means with respect to some unique region on the field pole means characterized by a neutral axis between the two opposite field poles, wherein said commutation signals selectively control the semiconductor switching devices, located on the motor armature means, in proper sequence to reverse the direction of current in the coils of said motor armature means at a desired point of rotation in order to effect commutation and thereby generating a required electromechanical action between the motor armature means and the motor field member means; and (3) a rectifier unit for supplying DC power to the coils of said motor armature means for DC operation.

7. The brushless rotating electrical machine as claimed in claim 6 wherein aid means for generating commutation signals comprises:

a position sensor means and a means to activate the same, wherein said position senor means defines an angular position of said motor armature means by communicating a predetermined logic level to said semiconductor switching devices, to switch a required voltage to the coils of the motor armature means in a selected direction to produce a required torque; and a shaft position encoding means interposed between said position sensor means and said means to activate the same, wherein said position encoding means controls the timing relationship of the commutation signals produced by sad position sensor means by controlling the action of said means to activate the same on the position sensor means to a predetermined logic truth table determined by the relative position of the position sensor means with respect to some unique region on the motor armature means characterized by the neutral axis between the two field pole means and thereby accurately controlling the switching time and the direction of current flow in each coil of said motor armature means.

8. The brushless rotating electrical machine as claimed in claim 6 wherein said field pole means comprises a means to create magnetic flux including a permanent magnet and a coil energized electromagnet inn at least one north and south pole pair, and said field pole means is connected to the coils of said motor armature means through the brushless power unit in series, shunt, and compound mode for DC operation and in series mode for AC operation.

9. The brushless rotating electrical machine as claimed in claim 6 wherein said semiconductor switching devices are controlled such that each coil of said motor armature means is energized only during a period when it is magnetically coupled by flux under said field pole means and is de-energized when it is in the interpolar region thereby minimizing armature action and eliminating the need for interpoles and compensating windings, and after each coil of said motor armature means passes through the magnetic neutral axis between the two opposite magnetic poles of reverse polarity on said field pole means, at which point the direction of the current in each coil of the motor armature means is reversed to continue the torque in the same direction.

10. The brushless rotating electrical machine as claimed in claim 6 wherein said semiconductors switching devices are controlled by pulse width modulation signals from said means for generating commutation signals, and when pulse width modulation control is not intended, conventional method of using resistor in series with the motor armature means or the motor field member means is used to control the speed of the machine.

11. The brushless rotating electrical machine as claimed in claim 6 further comprises:

a polyphase AC winding means including a plurality of coils capable of generating a rotating magnetic field, said polyphase AC winding means is located on said motor field member means;

a first brushless power unit means comprising a plurality of said brushless power units connected to said polyphase AC winding means, said first brushless power unit means is located on said motor armature means;

said plurality of semiconductor switching devices, located on the timing and control unit, commutates the current in the coils of said polyphase AC winding means, thereby generating slip frequency power output in the coils of said polyphase AC winding means; and said motor field member means is supplied with voltage at supply frequency whereby a motor action occurs by interaction between the motor armature means and the motor field member means.

12. The brushless rotating electrical machine as claimed in claim 6 further comprises:

a first polyphase AC winding means, located on said motor field member means;

a first brushless power unit means supplying AC power to a second polyphase AC winding means, located on said motor armature means and is supplied with voltage at supply frequency;

a secondary polyphase AC winding means, located on said motor armature means, and coupled to said second polyphase AC winding means;

a second brushless power unit means connected to the secondary polyphase AC winding means;

said plurality of semiconductor switching devices commutates the current in said second polyphase AC winding means thereby generating slip frequency power output in said secondary polyphase AC winding means; and said secondary polyphase AC winding means is further connected to the second brushless power unit means whereby a slip frequency voltage is induced at a stationary member of the second brushless power unit means which is then injected in the first polyphase AC winding means, and when connected in a schrage type motor configuration, speed and power factor can be controlled.

13. The brushless rotating electrical machine as claimed in claim 6 wherein said motor armature means comprises disc type rotor having radial slots to carry current in the coils of said motor armature means, and said motor field member means produces flux along the axis of the machine shaft to link the coils of said motor armature means, 14. The brushless rotating electrical machine as claimed in claim 6 wherein said motor armature means comprises disc type rotor with radial slots to carry DC excitation.

* * * * *